United States Patent
Koike et al.

(10) Patent No.: US 11,667,287 B2
(45) Date of Patent: Jun. 6, 2023

(54) VEHICLE AND CONTROL DEVICE OF THE SAME

(71) Applicant: HONDA MOTOR CO., LTD., Tokyo (JP)

(72) Inventors: Satoshi Koike, Wako (JP); Ryuichi Hata, Wako (JP); Naoyuki Kubo, Wako (JP); Takayuki Sakata, Wako (JP); Masayasu Yoshida, Wako (JP); Mitsuru Nonaka, Tokyo (JP); Seiichi Kato, Tokyo (JP); Masanori Yoshihira, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 144 days.

(21) Appl. No.: 17/167,372

(22) Filed: Feb. 4, 2021

(65) Prior Publication Data
US 2021/0284152 A1 Sep. 16, 2021

(30) Foreign Application Priority Data
Mar. 11, 2020 (JP) .............................. JP2020-042111

(51) Int. Cl.
*B60W 30/17* (2020.01)
*B60W 30/16* (2020.01)

(52) U.S. Cl.
CPC ............ *B60W 30/17* (2013.01); *B60W 30/16* (2013.01); *B60W 2554/404* (2020.02); *B60W 2554/802* (2020.02); *B60W 2556/65* (2020.02); *B60W 2754/30* (2020.02)

(58) Field of Classification Search
None
See application file for complete search history.

(56) References Cited

U.S. PATENT DOCUMENTS

| | | | |
|---|---|---|---|
| 7,486,199 B2 * | 2/2009 | Tengler | G08G 1/0965 340/901 |
| 10,049,573 B1 * | 8/2018 | Surnilla | G08G 1/091 |
| 2014/0324329 A1 * | 10/2014 | Abuelsaad | B60Q 1/525 701/300 |
| 2016/0229402 A1 * | 8/2016 | Morita | G08G 1/163 |
| 2019/0385463 A1 * | 12/2019 | Cantrell | G08G 5/0021 |
| 2020/0010062 A1 * | 1/2020 | Switkes | B60T 8/1887 |
| 2020/0094830 A1 | 3/2020 | Ito et al. | |
| 2020/0298853 A1 * | 9/2020 | Bast | G08G 1/166 |

FOREIGN PATENT DOCUMENTS

| | | |
|---|---|---|
| JP | 2019-1227 A | 1/2019 |
| JP | 2019-156197 A | 9/2019 |

* cited by examiner

*Primary Examiner* — David P. Merlino
(74) *Attorney, Agent, or Firm* — WHDA, LLP

(57) ABSTRACT

A control device of a vehicle is configured to control travelling of the vehicle such that the vehicle follows a preceding vehicle based on information received from the preceding vehicle, and determine, based on information regarding a cargo space of the preceding vehicle, an inter-vehicle distance to the preceding vehicle when the vehicles stop. Upon the preceding vehicle having stopped, the device stops the vehicle such that a distance between the vehicle and the preceding vehicle becomes the inter-vehicle distance determined by the device.

9 Claims, 7 Drawing Sheets

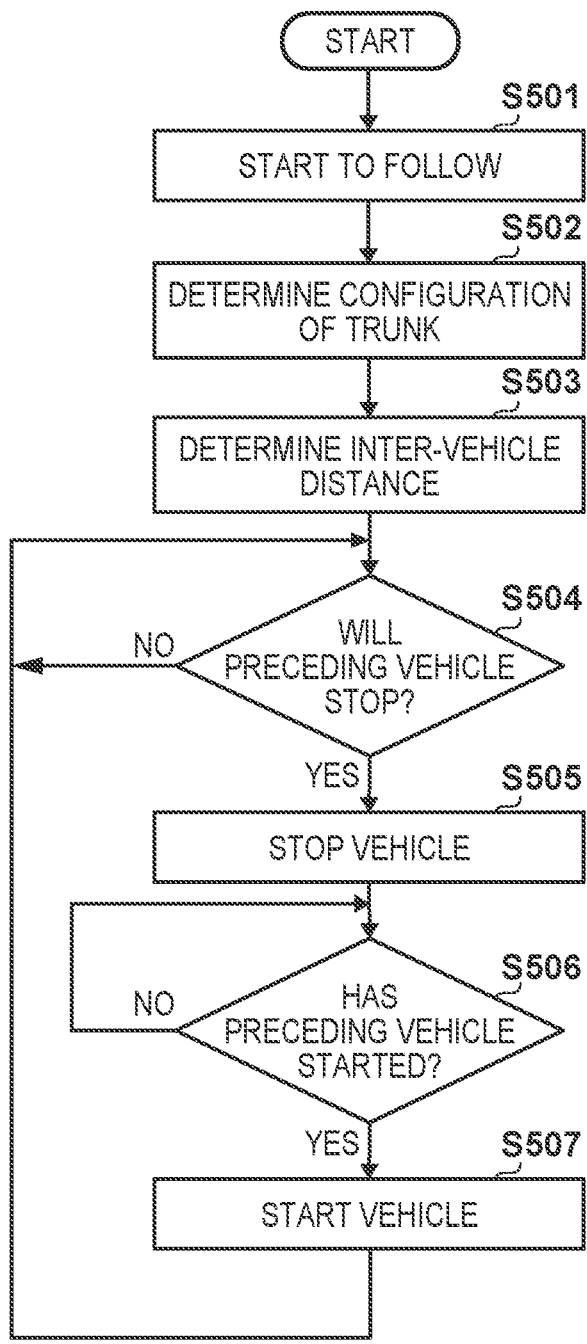

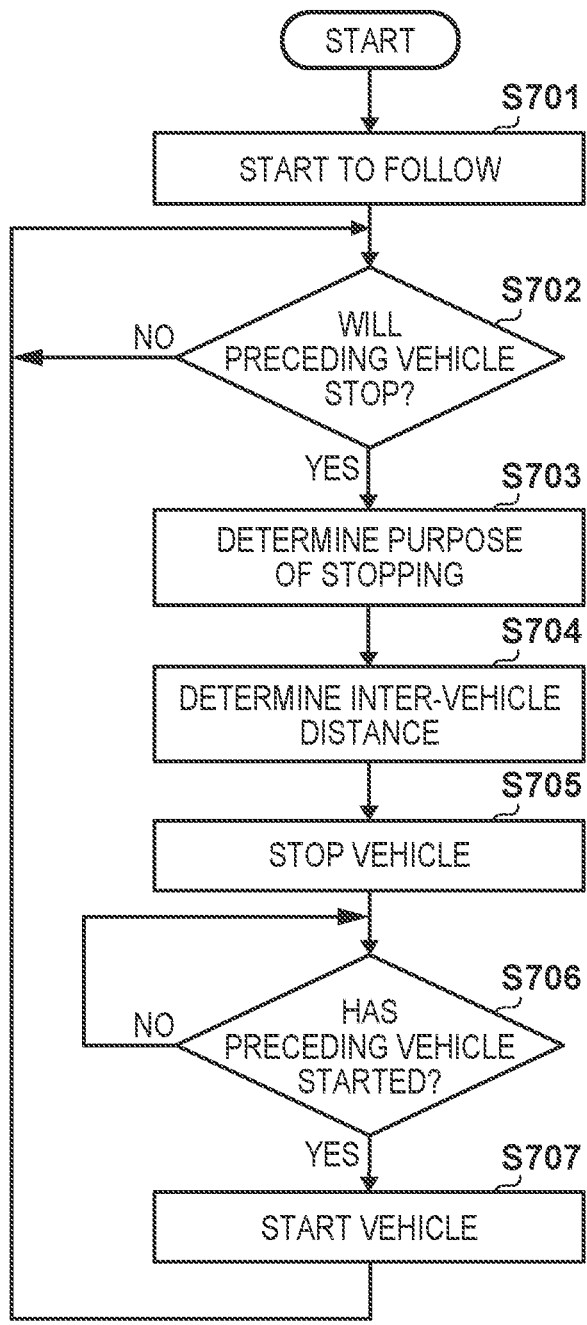

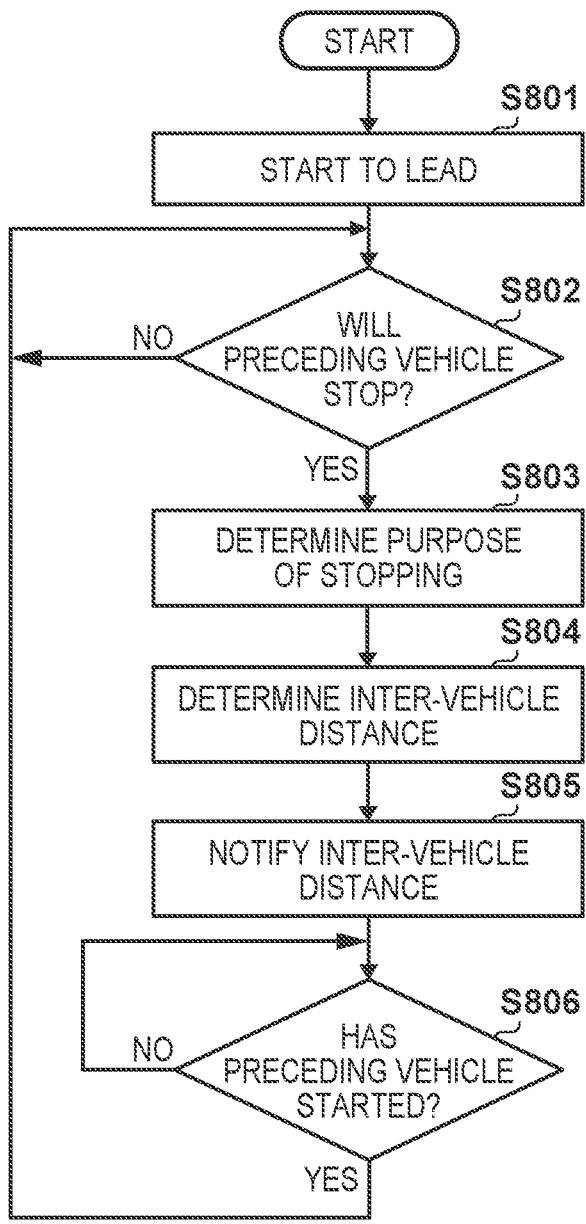

VEHICLE AND CONTROL DEVICE OF THE SAME

CROSS-REFERENCE TO RELATED APPLICATION(S)

This application claims priority to and the benefit of Japanese Patent Application No. 2020-042111 filed on Mar. 11, 2020, the entire disclosure of which is incorporated herein by reference.

BACKGROUND OF THE INVENTION

Field of the Invention

The present invention relates to a vehicle and a control device of the vehicle.

Description of the Related Art

Technologies for electronically coupling a following vehicle to a preceding vehicle so that the following vehicle automatically follows the preceding vehicle are known. In Japanese Patent Laid-Open No. 2019-1227, the following vehicle is controlled to keep a closest proximity distance to the preceding vehicle at a preset distance. In Japanese Patent Laid-Open No. 2019-156197, a movement state of the preceding vehicle is restricted based on the performance of the following vehicle.

Two electronically coupled vehicles maintain a short inter-vehicle distance to keep another vehicle from entering between the two vehicles. If the two vehicles stop while maintaining the short inter-vehicle distance, a trunk of the preceding vehicle may be difficult to use.

SUMMARY OF THE INVENTION

In one aspect of the present invention, a technique by which a following vehicle that is following another vehicle is stopped at an appropriate position is provided. According to an embodiment, a control device of a vehicle is provided. The device comprises a memory for storing computer readable code; and a processor operatively coupled to the memory. The processor is configured to control travelling of the vehicle such that the vehicle follows a preceding vehicle based on information received from the preceding vehicle; and determine, based on information regarding a cargo space of the preceding vehicle, an inter-vehicle distance to the preceding vehicle when the vehicles stop. Upon the preceding vehicle having stopped, the processor stops the vehicle such that a distance between the vehicle and the preceding vehicle becomes the inter-vehicle distance determined by the processor.

BRIEF DESCRIPTION OF THE DRAWINGS

FIG. 5 is a flowchart showing an example operation of a control device of a following vehicle according to a first embodiment.
FIG. 7 is a flowchart showing an example operation of a control device of a following vehicle according to a second embodiment.
FIG. 8 is a flowchart showing an example operation of a control device of a preceding vehicle according to the second embodiment.

DESCRIPTION OF THE EMBODIMENTS

Figure 1:
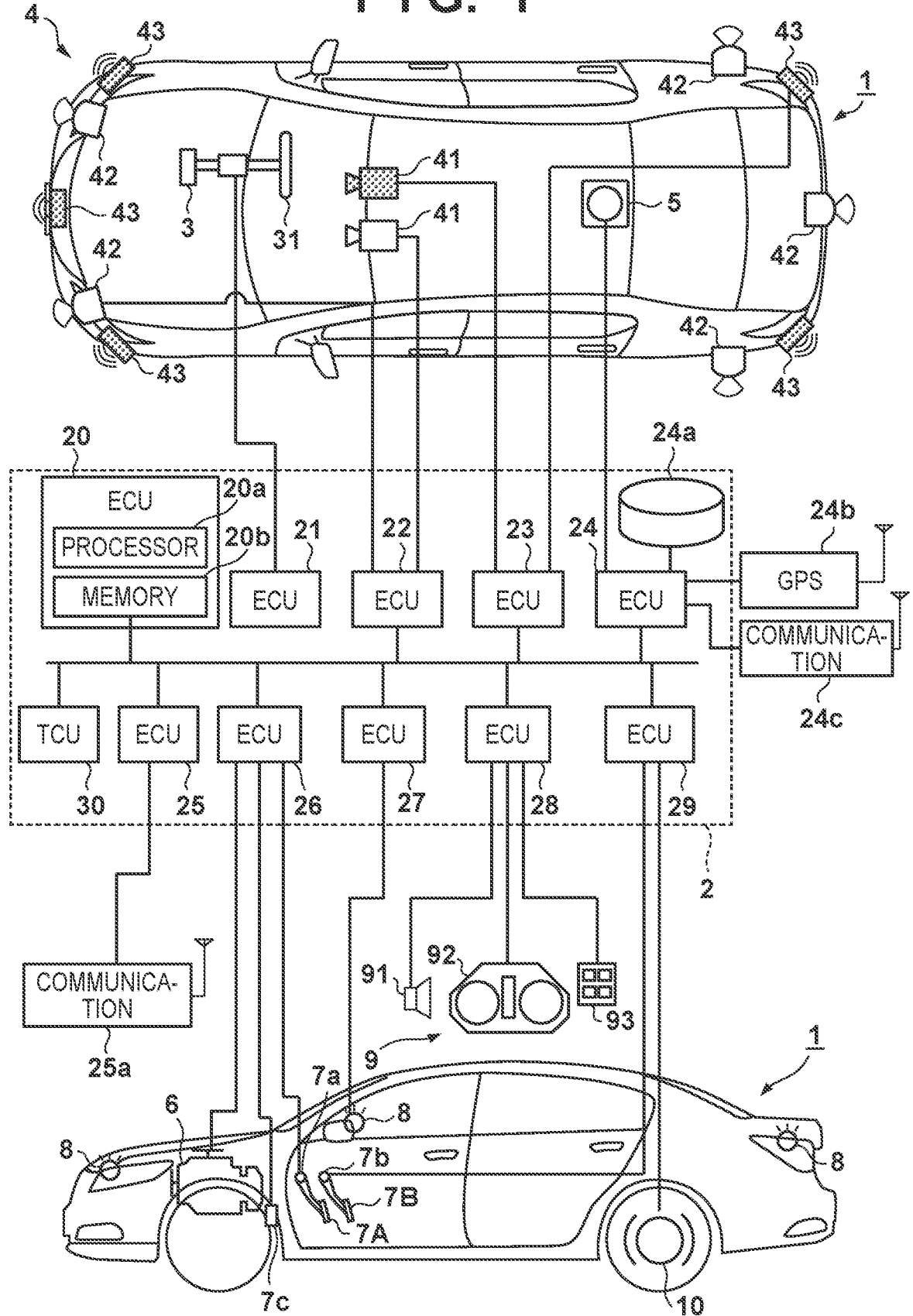
FIG. 1 is a block diagram showing an example configuration of a vehicle according to various embodiments.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a block diagram of a vehicle 1 according to various embodiments of the present invention. FIG. 1 shows a schematic plan view and a schematic side view of the vehicle 1. An example of the vehicle 1 is a sedan-type four-wheel passenger car. The vehicle 1 may be such a four-wheel vehicle, a two-wheel vehicle, or a vehicle of another type.

The vehicle 1 includes a control device 2 for a vehicle (hereinafter simply referred to as a "control device 2") that controls the vehicle 1. The control device 2 includes a plurality of ECUs 20 to 29 that are communicably connected to each other via an in-vehicle network. Each ECU includes a processor represented by a CPU, a memory such as a semiconductor memory, an interface with an external device, and the like. A program that is executed by the processor, data that is used by the processor for processing, and the like are stored in the memory. Each ECU may also include a plurality of processors, a plurality of memories, a plurality of interfaces, and the like. For example, the ECU 20 includes a processor 20a and a memory 20b. As a result of commands included in a program stored in the memory 20b being executed by the processor 20a, processing is executed by the ECU 20. Alternatively, the ECU 20 may also include a dedicated integrated circuit such as an ASIC for executing the processing by the ECU 20. This also applies to the other ECUs.

The following describes functions and the like of the ECUs 20 to 29. Note that the number of ECUs and functions of the ECUs can be appropriately designed, and the ECUs and the functions in the present embodiment may also be divided or integrated.

The ECU 20 executes control relating to automated driving of the vehicle 1. In the automated driving, at least one of the steering or the speed of the vehicle 1 is automatically controlled.

The ECU 21 controls an electric power steering device 3. The electric power steering device 3 includes a mechanism for steering front wheels in response to a driving operation (steering operation) made by the driver on a steering wheel 31. Also, the electric power steering device 3 includes a motor that generates a driving force for assisting the steering operation or automatically steering the front wheels, a sensor that detects a steering angle, and the like. If the vehicle 1 is in an automated driving state, the ECU 21 automatically controls the electric power steering device 3 following an instruction from the ECU 20 to control the travelling direction of the vehicle 1.

The ECUs 22 and 23 control detection units 41 to 43 for detecting conditions of a surrounding region of the vehicle and perform information processing of detection results. The detection units 41 are cameras (hereinafter may be referred to as "cameras 41") that capture images of a region in front of the vehicle 1, and are attached to the interior side of a front window in a front region of a roof of the vehicle 1 in the present embodiment. Contours of an object and a mark line (e.g., a white line) of a lane on a road can be extracted by analyzing images captured by the cameras 41.

The detection units 42 are LIDARs (Light Detection and Ranging, hereinafter may be referred to as "LIDARs 42"), and detect objects around the vehicle 1 and measure a distance to an object, for example. In the present embodiment, five LIDARs 42 are provided, two of them being respectively installed in front corner portions of the vehicle 1, one being installed in a rear center portion, and two being respectively installed in rear side portions. The detection units 43 are millimeter-wave radars (hereinafter may be referred to as "radars 43"), and detect objects around the vehicle 1 and measure a distance to an object, for example. In the present embodiment, five radars 43 are provided, one of them being installed in a front center portion of the vehicle 1, two being respectively installed in front corner portions, and two being respectively installed in rear corner portions.

The ECU 22 controls one of the cameras 41 and each LIDAR 42, and performs information processing of detection results. The ECU 23 controls the other camera 41 and each radar 43, and performs information processing of detection results. Reliability of detection results can be improved as a result of two sets of devices that detect conditions of a surrounding region of the vehicle being provided, and multifaceted analysis of a surrounding environment of the vehicle can be performed as a result of different types of detection units such as the cameras, the LIDARs, and the radars being provided.

The ECU 24 controls a gyroscope sensor 5, a GPS sensor 24b, and a communication device 24c, and performs information processing of detection results and communication results. The gyroscope sensor 5 detects a rotational movement of the vehicle 1. The course of the vehicle 1 can be determined based on a result of detection performed by the gyroscope sensor 5, a wheel speed, and the like. The GPS sensor 24b detects a current position of the vehicle 1. The communication device 24c performs wireless communication with a server that provides map information and traffic information, and acquires these types of information. The ECU 24 can access a database 24a of map information that is constructed in a memory, and finds a route from the current position to a destination, for example. The ECU 24, the map database 24a, and the GPS sensor 24b constitute what is called a navigation device.

The ECU 25 includes a communication device 25a for inter-vehicle communication. The communication device 25a performs wireless communication with another vehicle that is in a surrounding region, and exchanges information with the other vehicle. A TCU (Telematics Control Unit) 30 communicates with a network using a cellular communication line. The TCU 30 may also perform communication using Wi-Fi (registered trademark), DSRC (Dedicated Short Range Communications), or the like.

The ECU 26 controls a power plant 6. The power plant 6 is a mechanism that outputs a driving force for rotating driving wheels of the vehicle 1, and includes an engine and a transmission, for example. The ECU 26 controls output of the engine in response to a driving operation (an operation made on an accelerator or an acceleration operation) that is made by the driver and detected by an operation detection sensor 7a provided in an acceleration pedal 7A, and switches a gear range of the transmission based on information regarding a vehicle speed or the like that is detected by a vehicle speed sensor 7c, for example. If the vehicle 1 is in the automated driving state, the ECU 26 automatically controls the power plant 6 following an instruction from the ECU 20 to control acceleration and deceleration of the vehicle 1.

The ECU 27 controls lighting devices (headlights, taillights, etc.) including direction indicators 8 (blinkers). In the example shown in FIG. 1, the direction indicators 8 are provided in a front portion, door mirrors, and a rear portion of the vehicle 1.

The ECU 28 controls an input/output device 9. The input/output device 9 outputs information to the driver and accepts input of information from the driver. An audio output device 91 gives information to the driver using sound. A display device 92 gives information to the driver by displaying images. The display device 92 is arranged in a surface in front of the driver's seat, for example, and constitutes an instrument panel or the like. Note that information is given using sound and display in this example, but information may also be given using vibration or light. Also, information may also be given using a combination of two or more of sound, display, vibration, and light. Furthermore, it is also possible to vary the combination or the manner of giving information according to the level (e.g., urgency) of information to be given. An input device 93 is arranged at a position at which the input device can be operated by the driver, and is constituted by a group of switches for giving instructions to the vehicle 1, but may also include an audio input device.

The ECU 29 controls brake devices 10 and a parking brake (not shown). The brake devices 10 are disk brake devices, for example, are respectively provided on the wheels of the vehicle 1, and decelerate or stop the vehicle 1 by applying resistance to rotation of the wheels. The ECU 29 controls operations of the brake devices 10 in response to a driving operation (a brake operation) that is made by the driver and detected by an operation detection sensor 7b provided in a brake pedal 7B, for example. If the vehicle 1 is in the automated driving state, the ECU 29 automatically controls the brake devices 10 following an instruction from the ECU 20 to control deceleration and a stop of the vehicle 1. The brake devices 10 and the parking brake can also operate to maintain a stopped state of the vehicle 1. If the transmission of the power plant 6 includes a parking lock mechanism, it is also possible to cause the parking lock mechanism to operate to maintain the stopped state of the vehicle 1.

An overview of an electronically coupled travelling system will be described with reference to FIG. 2. The electronically coupled travelling system can also be called a platooning system or an electronical traction system. The electronically coupled travelling system is a system in which two or more vehicles travel in an electronically coupled state. The electronically coupled state is a state in which information that is used in travelling of a following vehicle can be provided by a preceding vehicle to the following vehicle when necessary. The electronically coupled following vehicle can automatically follow the preceding vehicle without a driving operation being made by the driver. A person may be present or absent in the driver's seat of the following vehicle. A general configuration of the electronically coupled travelling system may be similar to those in conventional technologies, and therefore the following describes an overview of the general configuration.

Figure 2:
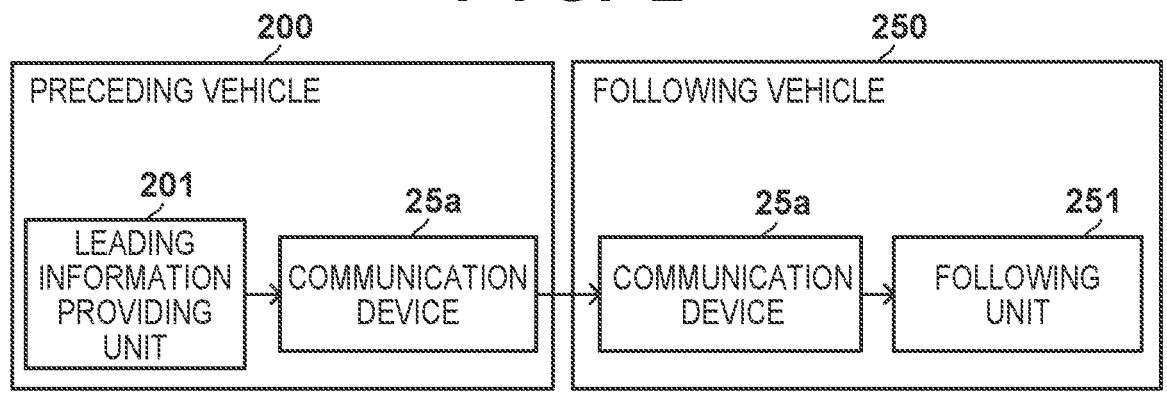
FIG. 2 is a block diagram showing an example configuration of an electronically coupled travelling system according to various embodiments.

FIG. 2 shows examples of functional configurations of a preceding vehicle 200 and a following vehicle 250 that constitute the electronically coupled travelling system. Both the preceding vehicle 200 and the following vehicle 250 may have the same configuration as that of the vehicle 1 shown in FIG. 1. Some of the constitutional elements shown in FIG. 1 are omitted in FIG. 2.

The preceding vehicle 200 includes a leading information providing unit 201. The leading information providing unit 201 may also be realized by the ECU 20 that executes control relating to automated driving. Alternatively (e.g., if the preceding vehicle 200 does not include an automated driving function), the leading information providing unit 201 may also be realized by another ECU in the control device 2.

The leading information providing unit 201 collects information (hereinafter referred to as "travelling information") regarding travelling of the preceding vehicle 200 such as amounts of operations made by the driver on the acceleration pedal 7A, the brake pedal 7B, and the steering wheel 31 and a vehicle speed detected by the vehicle speed sensor 7c. The leading information providing unit 201 generates information (hereinafter referred to as "leading information") that is used by the following vehicle 250 to follow the preceding vehicle 200, based on the travelling information. The leading information providing unit 201 provides the leading information to the following vehicle 250 via the communication device 25a. Communication between the communication device 25a of the preceding vehicle 200 and the communication device 25a of the following vehicle 250 may also be performed as inter-vehicle communication. The preceding vehicle 200 may be manually driven or automatically driven while leading the following vehicle 250.

The following vehicle 250 includes a following unit 251. The following unit 251 may also be realized by the ECU 20 that executes control relating to automated driving. Alternatively (e.g., if the following vehicle 250 does not include an automated driving function), the following unit 251 may also be realized by another ECU shown in FIG. 1 or a dedicated ECU (not shown).

The following unit 251 acquires the leading information from the preceding vehicle 200 via the communication device 25a. The following unit 251 automatically controls travelling of the following vehicle 250 (specifically, driving amounts of actuators relating to driving, braking, and steering) to follow the preceding vehicle 200, based on the leading information. The following unit 251 may also control travelling of the following vehicle 250 to follow the preceding vehicle 200, further based on a distance, a speed, an angle, or the like relative to the preceding vehicle 200, which is acquired by the detection units 41 to 43. The following vehicle 250 may also follow the preceding vehicle 200 by travelling along the same path as the preceding vehicle 200 (e.g., such that tracks of the center of the vehicle width of the preceding vehicle 200 match tracks of the center of the vehicle width of the following vehicle 250). The following unit 251 may cause the following vehicle 250 to follow the preceding vehicle 200 such that the distance between the preceding vehicle 200 and the following vehicle 250 is kept constant or the distance is varied according to the vehicle speed by, for example, making the distance short when the following vehicle 250 stops or travels at a low speed, and making the distance long when the following vehicle 250 travels at a high speed. Hereinafter, the distance between the preceding vehicle 200 and the following vehicle 250 will be simply referred to as an "inter-vehicle distance between the two vehicles". When the vehicles are travelling, the inter-vehicle distance between the two vehicles may be a short distance (e.g., 1 m) that keeps another vehicle from entering between the preceding vehicle 200 and the following vehicle 250, and when the vehicles are stopped, the inter-vehicle distance between the two vehicles may be a shorter distance (e.g., 50 cm) that makes a pedestrian hesitate to enter between the preceding vehicle 200 and the following vehicle 250.

Figure 3:
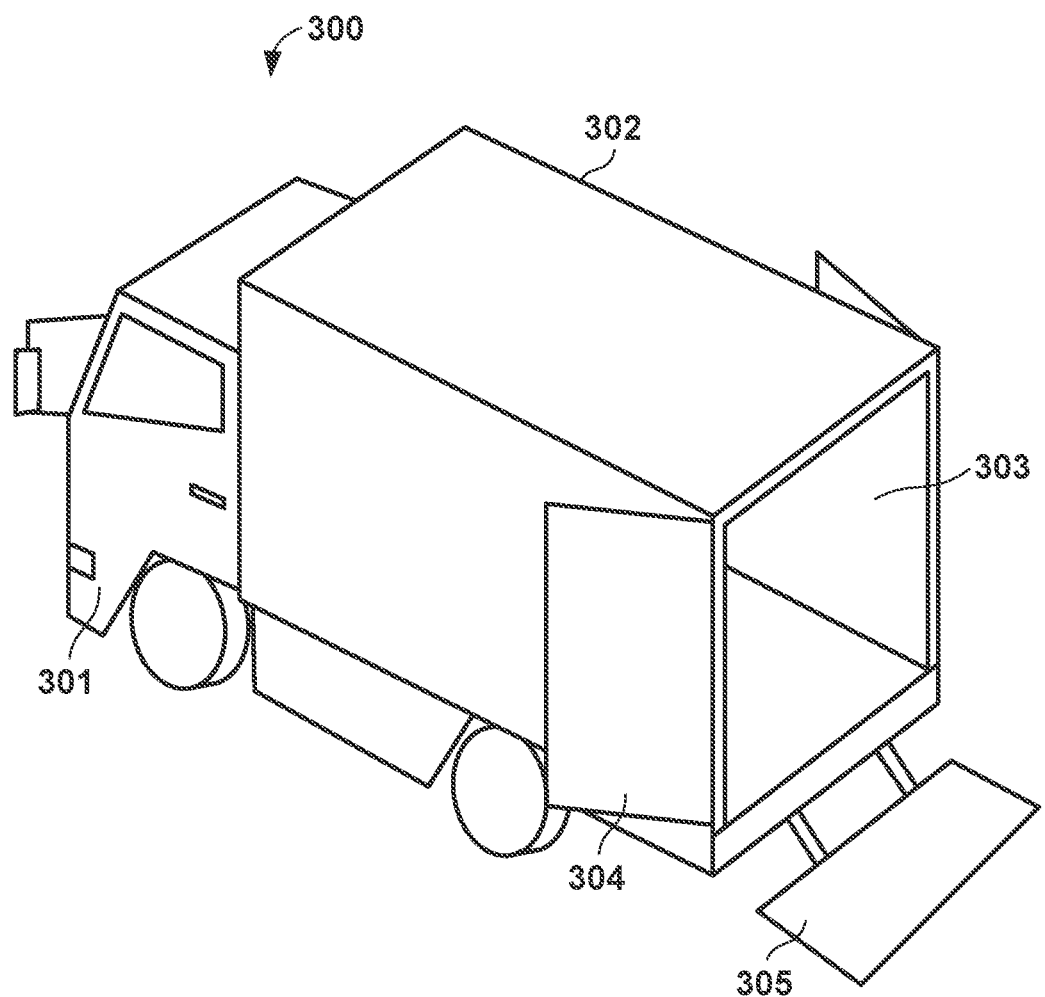
FIG. 3 is a schematic diagram showing an example configuration of a truck.

In the electronically coupled travelling system, various types of vehicles can be the preceding vehicle 200. An example configuration of a truck 300, which is an example of vehicles that can be the preceding vehicle 200, will be described with reference to FIG. 3. The truck 300 is constituted by a vehicle body 301 and an accessory 302. In the example shown in FIG. 3, the accessory 302 is a van, but the accessory 302 may be of another type such as a flat body. The accessory 302 includes a trunk 303 for storing cargo. The trunk 303 is an example of a space for storing cargo (i.e., cargo space). A double swing door 304 is provided on a vehicle rear side of the accessory 302. The swing door 304 is an example of an opening/closing body for accessing the trunk 303. Furthermore, a lift 305 that is used to load and unload the trunk is provided on the vehicle rear side of the accessory 302.

In order to use (e.g., load and unload) the trunk 303 of the accessory 302 that includes an opening/closing body (e.g., the swing door 304) that opens to the rear side of the vehicle, as is the case with the truck 300, a certain work space is necessary on the rear side of the vehicle. If the vehicle includes the lift 305 as is the case with the truck 300, a wider work space may be necessary. The inter-vehicle distance between the two vehicles is kept short as described above. If the vehicles stop while maintaining the distance, there is a risk that it will be difficult to access the trunk of the preceding vehicle. The present embodiment enables the following vehicle 250 to stop at an appropriate inter-vehicle distance as specifically described below. Specifically, the inter-vehicle distance between the two vehicles when the vehicles stop is determined based on information regarding a cargo space of the preceding vehicle 200. In a first embodiment described below, the information regarding the cargo space includes a configuration of the cargo space. In a second embodiment described below, the information regarding the cargo space includes information indicating whether a purpose of stopping the preceding vehicle 200 is the use of the cargo space.

The inter-vehicle distance between the two vehicles when the vehicles stop will be described with reference to FIGS. 4A to 4D. FIGS. 4A to 4D show states where the following vehicle 250 is stopped as a result of the preceding vehicle 200 having stopped. In FIGS. 4A to 4D, the following vehicle 250 is a sedan, but may also be a vehicle of another type.

Figure 4A:
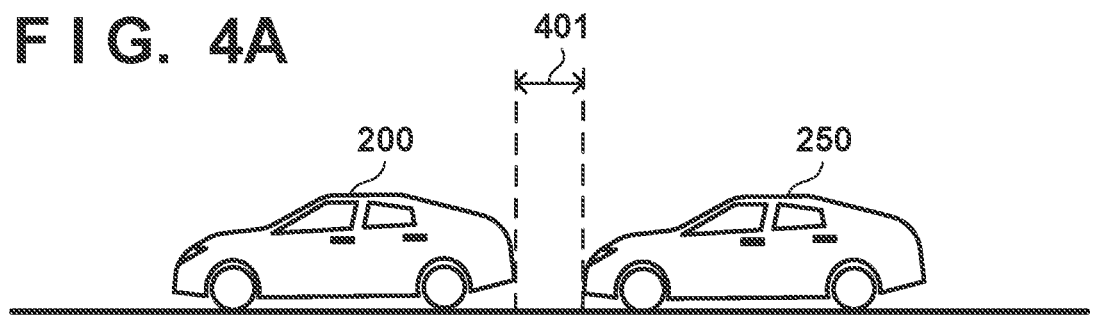
FIGS. 4A to 4D are schematic diagrams showing appropriate stopping positions according to various embodiments.

A case where the preceding vehicle 200 is a sedan and the trunk of the preceding vehicle 200 is not used while the preceding vehicle 200 stops will be described with reference to FIG. 4A. Vehicles such as sedans and hatchbacks are examples of vehicles of which opening/closing bodies provided on the rear side of the vehicles do not extend from rear ends of the vehicles even if the opening/closing bodies are opened. Since the trunk of the preceding vehicle 200 is not used while the preceding vehicle 200 stops, there is no inconvenience even if an inter-vehicle distance 401 between the two vehicles is short. Accordingly, the inter-vehicle distance 401 may be a value, such as 1 m or 50 cm, that keeps another vehicle from entering between the two vehicles or makes a pedestrian hesitate to enter between the two vehicles.

Figure 4B:
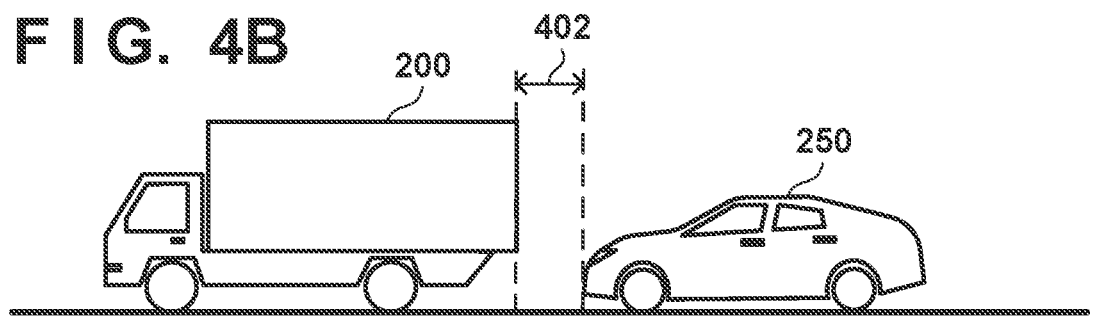

A case where the preceding vehicle 200 is a truck and the trunk of the preceding vehicle 200 is not used while the preceding vehicle 200 stops will be described with reference to FIG. 4B. Trucks (e.g., the vehicle shown in FIG. 3 in which the trunk 303 is provided in the accessory 302 that is separate from the vehicle body 301) and minivans are examples of vehicles of which opening/closing bodies provided on the rear side of the vehicles extend from rear ends of the vehicles when the opening/closing bodies are opened. Since the trunk of the preceding vehicle 200 is not used while the preceding vehicle 200 stops, there is no inconvenience even if an inter-vehicle distance 402 between the two vehicles is short. Accordingly, the inter-vehicle distance 402 may be a value, such as 1 m or 50 cm, that keeps another vehicle from entering between the two vehicles or makes a pedestrian hesitate to enter between the two vehicles. The inter-vehicle distance 402 may be equal to the inter-vehicle distance 401.

Figure 4C:
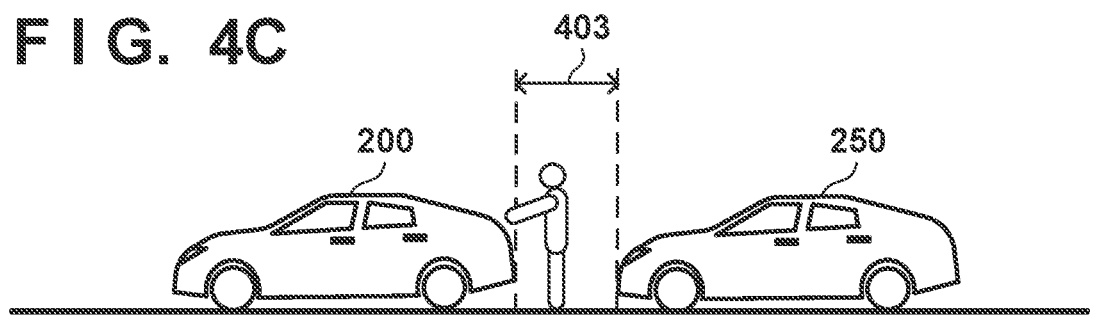

A case where the preceding vehicle 200 is a sedan and the trunk of the preceding vehicle 200 is used while the preceding vehicle 200 stops will be described with reference to FIG. 4C. Since the trunk of the preceding vehicle 200 is used while the preceding vehicle 200 stops, if an inter-vehicle distance 403 between the preceding vehicle 200 and the following vehicle 250 is short, the following vehicle 250 may hinder use of the trunk of the preceding vehicle 200. Accordingly, the inter-vehicle distance 403 may be longer than the inter-vehicle distance 401. For example, the inter-vehicle distance 403 may be twice (e.g., 2 m) the inter-vehicle distance 401.

Figure 4D:
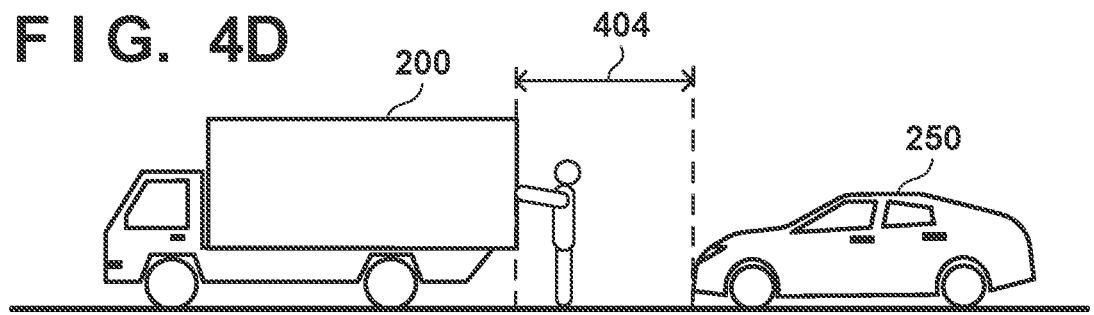

A case where the preceding vehicle 200 is a truck and the trunk of the preceding vehicle 200 is used while the preceding vehicle 200 stops will be described with reference to FIG. 4D. Since the trunk of the preceding vehicle 200 is used while the preceding vehicle 200 stops, if an inter-vehicle distance 404 between the two vehicles is short, the following vehicle 250 may hinder use of the trunk of the preceding vehicle 200. Accordingly, the inter-vehicle distance 404 may be longer than the inter-vehicle distance 402. Furthermore, in a case where the preceding vehicle 200 is a truck, a larger space may be necessary to use a cargo bed, when compared to a case where the preceding vehicle 200 is a sedan. Accordingly, the inter-vehicle distance 404 may be longer than the inter-vehicle distance 403. For example, the inter-vehicle distance 404 may be triple (e.g., 3 m) the inter-vehicle distance 402.

First Embodiment

A first embodiment for enabling the following vehicle 250 to stop at an appropriate inter-vehicle distance will be described. In the first embodiment, the inter-vehicle distance between the two vehicles when the two vehicles stop is determined based on a configuration of the trunk of the preceding vehicle 200. In an example operation shown in FIG. 5, the inter-vehicle distance between the two vehicles when the two vehicles stop is determined by the following vehicle 250. In an example operation shown in FIG. 6, the inter-vehicle distance between the two vehicles when the two vehicles stop is determined by the preceding vehicle 200.

A case where the following vehicle 250 determines the inter-vehicle distance between the two vehicles when the vehicles stop will be described with reference to FIG. 5. The example operation shown in FIG. 5 is executed by the control device 2 (specifically, the following unit 251) of the following vehicle 250. This operation may also be performed as a result of a processor (e.g., the processor 20a) of the control device 2 executing a program stored in a memory (e.g., the memory 20b). Alternatively, some or all steps of the operation shown in FIG. 5 may also be executed by a dedicated circuit.

In step S501, the control device 2 of the following vehicle 250 (in the following description of FIG. 5, the "control device 2 of the following vehicle 250" will be simply referred to as the "control device 2") starts to follow the preceding vehicle 200. After started to follow the preceding vehicle 200, the control device 2 continuously receives leading information from the preceding vehicle 200 and controls travelling of the following vehicle 250 based on the leading information.

In step S502, the control device 2 determines the configuration of the trunk of the preceding vehicle 200. The configuration of the trunk may include at least one of the size of the opening/closing body for accessing the trunk, a manner of attachment of the opening/closing body to the trunk, or the size of the trunk. The size of the opening/closing body may be the diameter of the door. The manner of attachment of the opening/closing body to the trunk may be information indicating whether the opening/closing body is attached such that the opening/closing body can be opened without extending from the rear end of the vehicle. The manner of attachment of the opening/closing body to the trunk may also be information indicating whether the opening/closing body is attached to the vehicle rear side of the trunk. The size of the trunk may be a bottom surface area of the trunk or a load capacity of the trunk.

The control device 2 may also determine the configuration of the trunk of the preceding vehicle 200 based on an image of the preceding vehicle 200 obtained by the detection units 41. Instead of or in addition to the above, the control device 2 may also determine the configuration of the trunk of the preceding vehicle 200 based on information from the preceding vehicle 200. The information may explicitly indicate the configuration of the trunk (e.g., with a specific value indicating the size) or implicitly indicate the configuration of the trunk (e.g., with a type of the vehicle or a model of the accessory). For example, the control device 2 may access a database in the control device 2 or an external database to find a specific size based on the type of the preceding vehicle 200 or the model of the accessory.

In step S503, the control device 2 determines the inter-vehicle distance between the two vehicles when the vehicles stop based on the configuration of the trunk of the preceding vehicle 200. For example, if the opening/closing body is only attached to a side position of the trunk of the preceding vehicle 200, a stopping position of the following vehicle 250 does not affect the use of the trunk of the preceding vehicle 200. Therefore, the control device 2 sets the inter-vehicle distance to be short, like the inter-vehicle distance 401 or 402. On the other hand, if the opening/closing body is attached to the vehicle rear side of the trunk, the control device 2 sets the inter-vehicle distance to be long, like the inter-vehicle distance 403 or 404. The control device 2 may also determine the inter-vehicle distance between the two vehicles based on the size of the opening/closing body and the size of the trunk. For example, in order that the opening/closing body can be opened, the control device 2 sets the inter-vehicle distance between the two vehicles to be longer than a length by which the opening/closing body extends from the rear end of the vehicle when the opening/closing body is opened. The control device 2 also considers a space for a person to stand to open the opening/closing body. Furthermore, it is thought that the larger the trunk is, the larger a work space used to load or unload the trunk becomes. Therefore, the control device 2 may also determine the inter-vehicle distance between the two vehicles such that the inter-vehicle distance has a positive correlation with the size of the trunk. The control device 2 stores the determined inter-vehicle distance in the memory 20b so that the inter-vehicle distance can be used in the following steps.

In step S504, the control device 2 determines whether the preceding vehicle 200 will stop based on leading information acquired from the preceding vehicle 200. Upon determining that the preceding vehicle 200 will stop ("YES" in step S504), the control device 2 proceeds to step S505, otherwise ("NO" in step S504) repeats step S504. For example, if the preceding vehicle 200 is decelerating and the speed of the preceding vehicle 200 is 5 km/hour or less, the control device 2 may determine that the preceding vehicle 200 will stop.

In step S505, upon the preceding vehicle 200 having stopped, the control device 2 stops the following vehicle 250 such that the inter-vehicle distance becomes the distance determined in step S503.

In step S506, the control device 2 determines whether the preceding vehicle 200 has started. Upon determining that the preceding vehicle 200 has started ("YES" in step S506), the control device 2 proceeds to step S507, otherwise ("NO" in step S506) repeats step S506.

In step S507, the control device 2 starts the following vehicle 250 as a result of the preceding vehicle 200 having started. Thereafter, the control device 2 returns to step S504 and waits until the preceding vehicle 200 stops.

Figure 6:
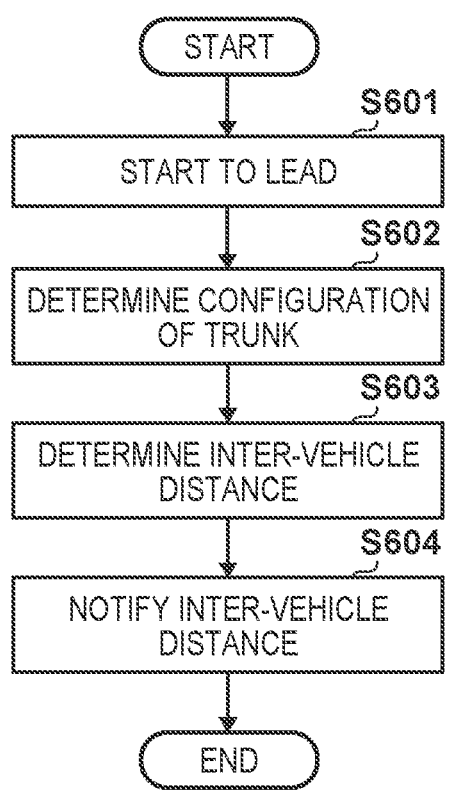
FIG. 6 is a flowchart showing an example operation of a control device of a preceding vehicle according to the first embodiment.

A case where the preceding vehicle 200 determines the inter-vehicle distance between the two vehicles when the vehicles stop will be described with reference to FIG. 6. The example operation shown in FIG. 6 is executed by the control device 2 (specifically, the leading information providing unit 201) of the preceding vehicle 200. This operation may also be performed as a result of a processor (e.g., the processor 20a) of the control device 2 executing a program stored in a memory (e.g., the memory 20b). Alternatively, some or all steps of the operation shown in FIG. 6 may also be executed by a dedicated circuit.

In step S601, the control device 2 of the preceding vehicle 200 (in the following description of FIG. 6, the "control device 2 of the preceding vehicle 200" will be simply referred to as the "control device 2") starts to lead the following vehicle 250. After it has started to lead the following vehicle 250, the control device 2 continuously transmits leading information to the following vehicle 250. The following vehicle 250 follows the preceding vehicle 200 based on the leading information.

In step S602, the control device 2 determines the configuration of the trunk of the preceding vehicle 200. Specific examples of the configuration of the trunk may be similar to those described in step S502. The control device 2 may also determine the configuration of the trunk of the preceding vehicle 200 based on information stored in a storage device (e.g., the memory 20b) of the control device 2. The information may explicitly indicate the configuration of the trunk (e.g., with a specific value indicating the size) or implicitly indicate the configuration of the trunk (e.g., with a type of the vehicle or a model of the accessory). For example, the control device 2 may access a database in the control device 2 or an external database to find a specific size based on the type of the preceding vehicle 200 or the model of the accessory.

In step S603, the control device 2 determines the inter-vehicle distance between the two vehicles when the vehicles stop based on the configuration of the trunk of the preceding vehicle 200. Specific determination methods may be similar to those described in step S503. In step S604, the control device 2 notifies the following vehicle 250 of the determined inter-vehicle distance between the two vehicles. Thereafter, the control device 2 continues to lead the following vehicle 250. Upon the preceding vehicle 200 having stopped, the control device 2 of the following vehicle 250 stops the following vehicle 250 such that the inter-vehicle distance between the two vehicles becomes the distance of the notification.

In the first embodiment, the following vehicle 250 stops such that the inter-vehicle distance becomes long enough to use the trunk of the preceding vehicle 200, regardless of whether the trunk of the preceding vehicle 200 is used while the preceding vehicle 200 stops. Accordingly, the inter-vehicle distance between the two vehicles may also be determined only once after the following vehicle starts to follow the preceding vehicle.

Second Embodiment

A second embodiment for enabling the following vehicle 250 to stop at an appropriate inter-vehicle distance will be described. In the second embodiment, the inter-vehicle distance between the two vehicles when the vehicles stop is determined based on whether a purpose of stopping the preceding vehicle 200 is the use of the trunk of the preceding vehicle 200. In an example operation shown in FIG. 7, the inter-vehicle distance between the two vehicles when the vehicles stop is determined by the following vehicle 250. In an example operation shown in FIG. 8, the inter-vehicle distance between the two vehicles when the vehicles stop is determined by the preceding vehicle 200.

A case where the following vehicle 250 determines the inter-vehicle distance between the two vehicles when the vehicles stop will be described with reference to FIG. 7. The example operation shown in FIG. 7 is executed by the control device 2 (specifically, the following unit 251) of the following vehicle 250. This operation may also be performed as a result of a processor (e.g., the processor 20a) of the control device 2 executing a program stored in a memory (e.g., the memory 20b). Alternatively, some or all steps of the operation shown in FIG. 7 may also be executed by a dedicated circuit.

In step S701, the control device 2 of the following vehicle 250 (in the following description of FIG. 7, the "control device 2 of the following vehicle 250" will be simply referred to as the "control device 2") starts to follow the preceding vehicle 200. After started to follow the preceding vehicle 200, the control device 2 continuously receives leading information from the preceding vehicle 200 and controls travelling of the following vehicle 250 based on the leading information.

In step S702, the control device 2 determines whether the preceding vehicle 200 will stop based on leading information acquired from the preceding vehicle 200. Upon determining that the preceding vehicle 200 will stop ("YES" in step S702), the control device 2 proceeds to step S703, otherwise ("NO" in step S702) repeats step S702. For example, if the preceding vehicle 200 is decelerating and the speed of the preceding vehicle 200 is 5 km/hour or less, the control device 2 may determine that the preceding vehicle 200 will stop.

In step S703, the control device 2 determines a purpose of stopping the preceding vehicle 200. The control device 2 may determine whether the purpose of stopping the preceding vehicle 200 is the use of the trunk of the preceding vehicle 200, based on a stopping position of the preceding vehicle 200, for example. The purpose of stopping the preceding vehicle 200 being the use of the trunk of the preceding vehicle 200 means that one purpose of stopping the preceding vehicle 200 is the use of the trunk of the preceding vehicle 200, and another purpose may also be included.

Specifically, if the preceding vehicle 200 stops near the center of a lane, the control device 2 may determine that the purpose of stopping the preceding vehicle 200 is not the use of the trunk. If the preceding vehicle 200 stops near a sidewalk, the control device 2 may determine that the purpose of stopping the preceding vehicle 200 is the use of the trunk. The stopping position in this case may be a relative position in a traffic environment around the preceding vehicle 200.

The control device 2 may also determine whether the purpose of stopping the preceding vehicle 200 is the use of the trunk of the preceding vehicle 200 based on a result of comparison between a position at which collection or delivery by the preceding vehicle 200 is scheduled and a stopping position of the preceding vehicle 200. For example, if the stopping position of the preceding vehicle 200 is in the vicinity of a delivery base or in the vicinity of a house at which collection or delivery is scheduled, the control device 2 may determine that the purpose of stopping the preceding vehicle 200 is the use of the trunk. The stopping position in this case may be a geographical position of the preceding vehicle 200. The control device 2 may also acquire, from the preceding vehicle 200, the position of a house at which collection or delivery by the preceding vehicle 200 is scheduled. Also, the control device 2 may also acquire the position of a delivery base from map data of a navigation system. If there is no building that can be a target at which collection or delivery is to be performed, around the stopping position of the preceding vehicle 200, the control device 2 may determine that the purpose of stopping the preceding vehicle 200 is not the use of the trunk.

The control device 2 may also determine whether the purpose of stopping the preceding vehicle 200 is the use of the trunk of the preceding vehicle 200, based on a notification from the preceding vehicle 200. The driver of the preceding vehicle 200 may also notify the following vehicle 250 of whether the purpose of stopping the preceding vehicle 200 is the use of the trunk of the preceding vehicle 200, every time the preceding vehicle 200 stops.

The control device 2 may also determine the purpose of stopping the preceding vehicle 200 based on a combination of the various criteria described above. If the purpose of stopping the preceding vehicle 200 cannot be determined, the control device 2 may also determine that the purpose is the use of the trunk, so that the use of the trunk of the preceding vehicle 200 will not be hindered.

In step S704, the control device 2 determines the inter-vehicle distance between the two vehicles when the vehicles stop, based on a determination result of the purpose of stopping the preceding vehicle 200. For example, if the purpose of stopping the preceding vehicle 200 is not the use of the trunk of the preceding vehicle 200, the control device 2 sets the inter-vehicle distance to be short, like the inter-vehicle distance 401 or 402. On the other hand, if the purpose of stopping the preceding vehicle 200 is the use of the trunk of the preceding vehicle 200, the control device 2 sets the inter-vehicle distance to be long, like the inter-vehicle distance 403 or 404. The control device 2 may also determine the configuration of the trunk of the preceding vehicle 200 similarly to step S502 and determine the inter-vehicle distance between the two vehicles when the vehicles stop further based on the configuration of the trunk.

In step S705, upon the preceding vehicle 200 having stopped, the control device 2 stops the following vehicle 250 such that the inter-vehicle distance becomes the distance determined in step S704. Steps S706 and S707 are similar to steps S506 and S507.

A case where the preceding vehicle 200 determines the inter-vehicle distance between the two vehicles when the vehicles stop will be described with reference to FIG. 8. The example operation shown in FIG. 8 is executed by the control device 2 (specifically, the leading information providing unit 201) of the preceding vehicle 200. This operation may also be performed as a result of a processor (e.g., the processor 20a) of the control device 2 executing a program stored in a memory (e.g., the memory 20b). Alternatively, some or all steps of the operation shown in FIG. 8 may also be executed by a dedicated circuit.

In step S801, the control device 2 of the preceding vehicle 200 (in the following description of FIG. 8, the "control device 2 of the preceding vehicle 200" will be simply referred to as the "control device 2") starts to lead the following vehicle 250. After started to lead the following vehicle 250, the control device 2 continuously transmits leading information to the following vehicle 250. The following vehicle 250 follows the preceding vehicle 200 based on the leading information.

In step S802, the control device 2 determines whether the preceding vehicle 200 will stop. Upon determining that the preceding vehicle 200 will stop ("YES" in step S802), the control device 2 proceeds to step S803, otherwise ("NO" in step S802) repeats step S802. For example, if the preceding vehicle 200 is decelerating and the speed of the preceding vehicle 200 is 5 km/hour or less, the control device 2 may determine that the preceding vehicle 200 will stop.

In step S803, the control device 2 determines the purpose of stopping the preceding vehicle 200 similarly to step S703. Unlike the case shown in FIG. 7, the control device 2 may also determine whether the purpose of stopping the preceding vehicle 200 is the use of the trunk of the preceding vehicle 200, based on an instruction from an occupant (e.g., the driver) of the preceding vehicle 200.

In step S804, the control device 2 determines the inter-vehicle distance between the two vehicles when the vehicles stop, similarly to step S704. In step S805, the control device 2 notifies the following vehicle 250 of the determined inter-vehicle distance between the two vehicles. In step S806, the control device 2 determines whether the preceding vehicle 200 has started. Upon determining that the preceding vehicle 200 has started ("YES" in step S806), the control device 2 proceeds to step S802, otherwise ("NO" in step S806) repeats step S806.

In the second embodiment, the following vehicle 250 stops such that the inter-vehicle distance becomes long enough to use the trunk of the preceding vehicle 200, based on whether the trunk of the preceding vehicle 200 will be used while the preceding vehicle 200 stops. Accordingly, every time the preceding vehicle 200 stops, whether the purpose of stopping the preceding vehicle 200 is the use of the trunk of the preceding vehicle 200 is determined, and the inter-vehicle distance between the two vehicles is determined based on a determination result.

Summary of Embodiments

Item 1

A control device (2) of a vehicle (1, 250), the device including:

a travel control unit (251) configured to control travelling of the vehicle such that the vehicle follows a preceding vehicle (200), based on information received from the preceding vehicle; and a distance determination unit (251) configured to determine, based on information regarding a cargo space (303) of the preceding vehicle, an inter-vehicle distance (401 to 404) to the preceding vehicle when the vehicles stop, wherein, upon the preceding vehicle having stopped, the travel control unit stops the vehicle such that a distance between the vehicle and the preceding vehicle becomes the inter-vehicle distance determined by the distance determination unit.

According to this item, when a following vehicle is following the preceding vehicle, the following vehicle can be stopped at a position at which the following vehicle does not hinder use of the cargo space of the preceding vehicle.

Item 2

The control device according to Item 1, wherein the information regarding the cargo space includes at least one of a size of an opening/closing body (304) for accessing the cargo space from the outside of the preceding vehicle, a manner of attachment of the opening/closing body to the cargo space, or a size of the cargo space.

According to this item, the following vehicle can be stopped at a more appropriate position.

Item 3

The control device according to Item 1 or 2, wherein the information regarding the cargo space includes information indicating whether a purpose of stopping the preceding vehicle is the use of the cargo space.

According to this item, the following vehicle can be stopped at a more appropriate position.

Item 4

The control device according to Item 3, wherein every time the preceding vehicle stops, the distance determination unit determines whether the purpose of stopping the preceding vehicle is the use of the cargo space and determines the inter-vehicle distance based on a determination result.

According to this item, the following vehicle can be stopped at an appropriate position every time the preceding vehicle stops.

Item 5

The control device according to Item 3 or 4, wherein the distance determination unit determines whether the purpose of stopping the preceding vehicle is the use of the cargo space based on a stopping position of the preceding vehicle.

According to this item, the purpose of stopping the vehicle can be accurately determined.

Item 6

The control device according to Item 5, wherein the distance determination unit determines whether the purpose of stopping the preceding vehicle is the use of the cargo space based on a result of comparison between a position at which collection or delivery by the preceding vehicle is scheduled and the stopping position of the preceding vehicle.

According to this item, the purpose of stopping the vehicle can be more accurately determined.

Item 7

The control device according to any one of Items 3 to 6, wherein the distance determination unit determines whether the purpose of stopping the preceding vehicle is the use of the cargo space based on a notification from the preceding vehicle.

According to this item, the purpose of stopping the vehicle can be accurately determined.

Item 8

A control device (2) of a vehicle (1, 200), the device including:

a providing unit (201) configured to provide a following vehicle (250) with information that is used by the following vehicle to follow the vehicle;

a distance determination unit (201) configured to determine, based on information regarding a cargo space (303) of the vehicle, an inter-vehicle distance (401 to 404) to the following vehicle when the vehicles stop; and a notification unit (201) configured to notify the following vehicle of the inter-vehicle distance determined by the distance determination unit.

According to this item, when the following vehicle is following a preceding vehicle, the following vehicle can be stopped at a position at which the following vehicle does not hinder use of the cargo space of the preceding vehicle.

Item 9

The control device according to Item 8, wherein the information regarding the cargo space includes at least one of a size of an opening/closing body (304) for accessing the cargo space from the outside of the vehicle, a manner of attachment of the opening/closing body to the cargo space, or a size of the cargo space.

According to this item, the following vehicle can be stopped at a more appropriate position.

Item 10

The control device according to Item 8 or 9, wherein the information regarding the cargo space includes information indicating whether a purpose of stopping the vehicle is the use of the cargo space.

According to this item, the following vehicle can be stopped at a more appropriate position.

Item 11

The control device according to Item 10, wherein every time the vehicle stops, the distance determination unit determines whether the purpose of stopping the vehicle is the use of the cargo space and determines the inter-vehicle distance based on a determination result.

According to this item, the following vehicle can be stopped at an appropriate position every time the preceding vehicle stops.

Item 12

The control device according to Item 10 or 11, wherein the distance determination unit determines whether the purpose of stopping the vehicle is the use of the cargo space based on a stopping position of the vehicle.

According to this item, the purpose of stopping the vehicle can be accurately determined.

Item 13

The control device according to Item 12, wherein the distance determination unit determines whether the purpose of stopping the vehicle is the use of the cargo space based on a result of comparison between a position at which collection or delivery by the vehicle is scheduled and the stopping position of the vehicle.

According to this item, the purpose of stopping the vehicle can be more accurately determined.

Item 14

The control device according to any one of Items 10 to 13, wherein the distance determination unit determines whether the purpose of stopping the vehicle is the use of the cargo space based on an instruction from an occupant of the vehicle.

According to this item, the purpose of stopping the vehicle can be accurately determined.

Item 15

A vehicle (1, 200, 250) including the control device (2) according to any one of Items 1 to 14.

According to this item, a vehicle including the features described above is provided.

The invention is not limited to the foregoing embodiments, and various variations/changes are possible within the spirit of the invention.

What is claimed is:

1. A control device of a vehicle, the device comprising:
a memory for storing computer readable code; and
a processor operatively coupled to the memory, the processor configured to:
control travelling of the vehicle such that the vehicle follows a preceding vehicle based on first information received from the preceding vehicle; and
determine, based on second information regarding a cargo space of the preceding vehicle, an inter-vehicle distance to the preceding vehicle when the vehicle and the preceding vehicle stop,
wherein, upon the preceding vehicle having stopped, the processor stops the vehicle such that a distance between the vehicle and the preceding vehicle becomes the inter-vehicle distance determined by the processor.

2. The control device according to claim 1,
wherein the second information regarding the cargo space includes at least one of a size of an opening and closing body for accessing the cargo space from the outside of the preceding vehicle, a manner of attachment of the opening and closing body to the cargo space, or a size of the cargo space.

3. The control device according to claim 1,
wherein the second information regarding the cargo space includes information indicating whether a purpose of stopping the preceding vehicle is the use of the cargo space.

4. The control device according to claim 3,
wherein every time the preceding vehicle stops, the processor determines whether the purpose of stopping the preceding vehicle is the use of the cargo space and determines the inter-vehicle distance based on a determination result.

5. The control device according to claim 3,
wherein the processor determines whether the purpose of stopping the preceding vehicle is the use of the cargo space based on a stopping position of the preceding vehicle.

6. The control device according to claim 5,
wherein the processor determines whether the purpose of stopping the preceding vehicle is the use of the cargo space based on a result of comparison between a position at which collection or delivery by the preceding vehicle is scheduled and the stopping position of the preceding vehicle.

7. The control device according to claim 3,
wherein the processor determines whether the purpose of stopping the preceding vehicle is the use of the cargo space based on a notification from the preceding vehicle.

8. A vehicle comprising the control device according to claim 1.

9. A computer-implemented method of control of a vehicle comprising:
controlling travelling of the vehicle such that the vehicle follows a preceding vehicle based on first information received from the preceding vehicle;
determining, based on second information regarding a cargo space of the preceding vehicle, an inter-vehicle distance to the preceding vehicle when the vehicle and the preceding vehicle stop; and
upon the preceding vehicle having stopped, stopping the vehicle such that a distance between the vehicle and the preceding vehicle becomes the determined inter-vehicle distance.

* * * * *